UNITED STATES PATENT OFFICE.

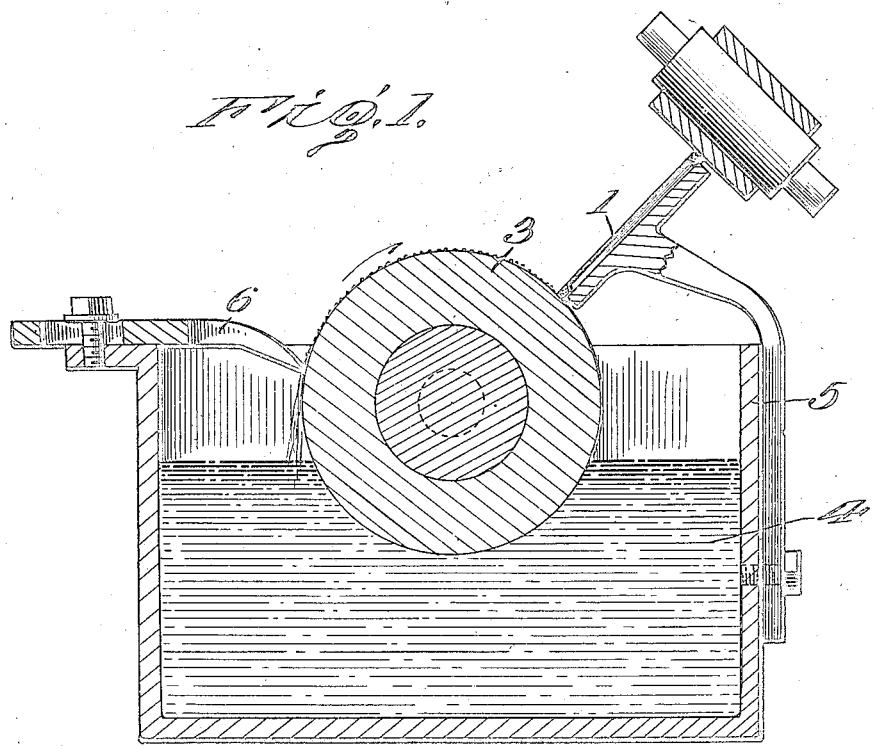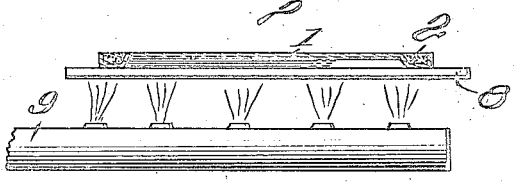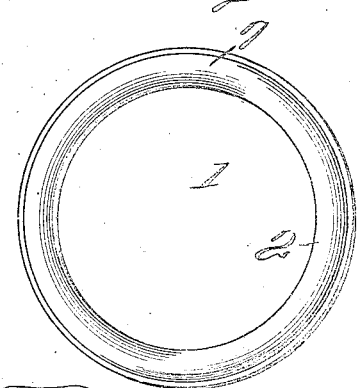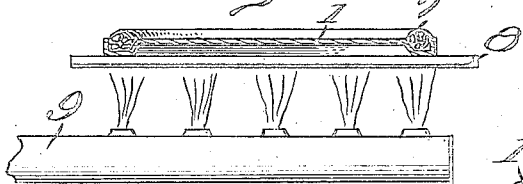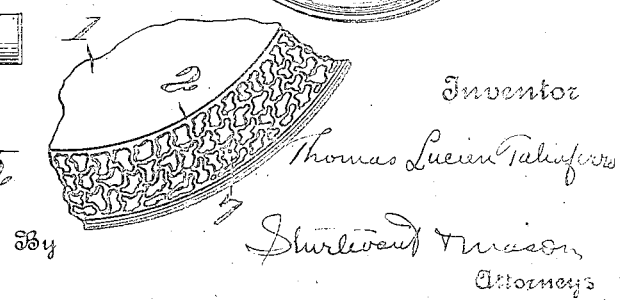

THOMAS LUCIEN TALIAFERRO, OF CHICAGO, ILLINOIS.

PROCESS OF FORMING SEALING MEMBERS FOR CONTAINERS.

1,427,134. Specification of Letters Patent. Patented Aug. 29, 1922.

Application filed June 21, 1920. Serial No. 390,502.

*To all whom it may concern:*

Be it known that I, THOMAS L. TALIAFERRO, a citizen of the United States, residing at Chicago, in the county of Cook, State of Illinois, have invented certain new and useful Improvements in Processes of Forming Sealing Members for Containers, of which the following is a description, reference being had to the accompanying drawing and to the figures of reference marked thereon.

The invention relates to new and useful improvements in the process of forming sealing members for containers, and more particularly to a process of forming a plastic hermetic sealing member.

An object of the invention is to provide a process of forming sealing members wherein the inner body portion of the resulting sealing member is of a sponge-like cellular mass, while the exterior surface of the plastic mass is substantially continuous.

A further object of the process is to provide a sealing member of the above character, which may be shaped and formed on the cover for the container.

These and other objects will in part be obvious and will in part be hereinafter more fully disclosed.

In the drawings which show by way of illustration one embodiment of the invention:—

Figure 1 is a view in section showing more or less diagrammatically one method of scraping the sealing substance on to the cover as the preliminary step in the forming of a sealing member;

Fig. 2 is a view showing the cover with the sealing substance applied thereto subjected to heat;

Fig. 3 is a similar view but showing the sealing substance as expanded and finally set in expanded condition;

Fig. 4 is a plan view of a cover having a ring sealing member applied thereto by my improved process, and Fig. 5 is an enlarged bottom view of a portion of the cover with the sealing ring cut through to show the sponge-like cells.

The sealing member as an article of manufacture is shown, described and claimed in my co-pending application Serial Number ____ filed of even date herewith. The present invention is directed more particularly to the process of forming this new sealing member. In the carrying out of the process, a plastic base, preferably a rubber base, such as para rubber, is provided with a suitable filler, and by the use of a solvent, such as benzol, for example, the whole is made into a plastic mass. This plastic mass is then placed on the cover or on the body portion of the container on an independent forming means by scraping or flowing, or in any suitable way, but preferably in the general shape which said mass is to take in its finished form for sealing. After the plastic mass has been placed on to the cover, container or forming means, it is then subjected to heat for a period of time. The length of time to which it is heated, and the intensity of the heat, changes somewhat the specific characteristics of the same, but under all conditions, the solvent driven off by the action of the heat forms through the entire inner body portion of the mass as it escapes, permanent visible sponge-like cells. If the heat is sufficiently intense, the expansion is so rapid that the entire mass will be puffed up or expanded during the process of setting; and the maintaining of the heat until the solvent is substantially all driven off, causes the sealing material to set in this expanded condition. On the other hand if the heat is comparatively low, the sealing substance may be slightly expanded at first and will then contract as it sets, but as above noted, under all conditions, the inner body portion of this substance is a sponge-like cellular mass, and the exterior of the mass is substantially continuous.

In Fig. 1 of the drawings, is shown one method of forming a sealing member, and that is by scraping the sealing material on to a cover. The cover indicated at 1 is preferably of metal and is provided with a groove 2 in which the sealing ring is formed. This cover 1 is rolled along a coating roll 3 which rotates in the mass of sealing material indicated at 4. The sealing material which is placed in the tank 5 as above noted, consists of a plastic base such as rubber, to which a suitable filler is added, and a solvent, such as benzol, and the whole is made into a plastic mass. As the roll 3 rotates, this plastic mass, which is adhesive in character, will adhere to the surface of the roll, and the scraper 6 will determine the thickness of the sealing material which is presented to the edge of the cover 1. The cover sets at an angle to the surface of the roll and will scrape the sealing material from the roll and this scraping and flowing of the sealing material causes a ring shaped member to be formed in the groove 2 as indicated at 7 in Figures 2 and 3 of the drawings. After the sealing material has been coated on the cover, the cover is placed on a suitable support 8 which is heated by means of a gas burner 9. The length of time to which the cover is heated and the intensity of heat may be regulated to suit required conditions in the sealing member which is finally formed. Relatively slow heat for a long period of time will cause the solvent to expand slightly, and be driven off slowly, and visible sponge-like cells are formed all through the mass; which cells will be relatively small. On the other hand, increased heat will cause the solvent to expand rapidly and be driven off more quickly, thus forming much larger sponge-like cells. The heating of the sealing substance causes the sponge-like cells to form and the mass to set in this condition. It is to be noted that the surface of the sealing member as finally formed is substantially continuous so that a uniform continuous sealing surface is provided and that the cells are disposed substantially wholly within the body portion of the substance, thus forming a cushion for the sealing surface of the sealing member.

While I have described my process as resulting in the form of a ring-like container, it will be readily understood that the process may be used in forming any shape of sealing member desired, and also that the process is not limited to the forming of the sealing member on the cover, or the body of the container, but the shaping of the sealing member may be accomplished by independent means. The essential feature is the forming of the material in the general shape desired for sealing, and then the heating of the same to bring about the cellular-like structure, which extends throughout the inner portion of the sealing member. It is also obvious that for certain characters of sealing members, the material may be converted into a sponge-like cellular mass and afterward cut to desired shape, as for example, a sealing disc for sealed bottles.

It is obvious that minor changes in the details of construction may be made without departing from the spirit of the invention as set forth in the appended claims.

Having thus described the invention, what I claim as new and desire to secure by Letters-Patent, is:—

1. The process of forming a sealing member for containers consisting in providing a plastic mass including a plastic base and a volatile solvent, shaping said mass to the general form for sealing and subjecting said shaped mass to heat sufficient to cause permanent, visible sponge-like cells to form throughout the entire body portion of the mass and leaving the surface of the mass substantially continuous.

2. The process of forming a sealing member for containers consisting in providing a plastic mass including a plastic base and a volatile solvent, scraping said mass on to the container closure to form the same into the general shape for sealing and subjecting said shaped mass on the container closure to heat sufficient to cause permanent, visible sponge-like cells to form throughout the entire body portion of the mass, and leaving the exterior surface of the mass substantially continuous.

3. The process of forming a sealing member for containers consisting in providing a plastic mass including a rubber base, a filler and benzol, scraping the plastic mass on to one of the members of the container and forming the same into the general shape for sealing, and subjecting said shaped mass on the container member to sufficient heat to cause permanent, visible sponge-like cells to form throughout the entire body portion of the mass, and leaving the surface of the mass substantially continuous.

In testimony whereof I affix my signature.

THOMAS LUCIEN TALIAFERRO.